US005156791A

United States Patent [19]

Sano et al.

[11] Patent Number: 5,156,791

[45] Date of Patent: Oct. 20, 1992

[54] DEPOSITING METHOD OF WALL CONCRETE

[75] Inventors: Naomitsu Sano, Tokyo; Kazuyuki Nakajima, Aichi; Hisashi Maeda, Aichi; Tatsuya Ohtsu, Aichi; Kazuhiro Ogasawara, Aichi; Tetsuya Itoh, Aichi, all of Japan

[73] Assignee: Inax Corporation, Aichi, Japan

[21] Appl. No.: 672,645

[22] Filed: Mar. 21, 1991

[30] Foreign Application Priority Data

Mar. 26, 1990 [JP] Japan .................................. 2-76301

[51] Int. Cl.[5] .......................... B28B 1/16; B28B 7/36; B32B 31/06; F04B 1/16

[52] U.S. Cl. ...................................... 264/219; 156/71; 264/34; 264/35; 264/133; 264/246; 264/256; 264/259; 264/261; 264/274; 264/316; 264/318; 264/333; 264/334; 264/338; 264/DIG. 31

[58] Field of Search .................................. 264/31-35, 264/313, 316, 317, 318, 333, 337, 338, 309, DIG. 31, 308, 264, 261, 274, 256, 219, 220, 224, 225, 334, 133, 246, 259; 156/245, 71

[56] References Cited

U.S. PATENT DOCUMENTS

| | | | |
|---|---|---|---|
| 1.053.257 | 2/1913 | Weakley | 264/316 X |
| 1,439,646 | 12/1922 | Smith | 264/317 |
| 1.666,232 | 4/1928 | Boynton | 264/317 X |
| 2.059,520 | 11/1936 | Harshberger | 264/313 X |
| 2,091,396 | 8/1937 | Rowe et al. | 264/313 X |
| 2,172,466 | 9/1939 | Edwardes et al. | 264/316 X |
| 2,178,535 | 10/1939 | Willson | 264/313 X |
| 3,359,354 | 12/1967 | Johnson | 264/35 |
| 3,594,465 | 7/1971 | Vrijma | 264/313 |
| 3,758,650 | 9/1973 | Hurst | 264/35 X |
| 3,843,089 | 10/1974 | Scholz et al. | 264/313 X |
| 3,884,444 | 5/1975 | Dashew | 264/35 X |
| 3,975,492 | 8/1976 | McLean et al. | 264/313 X |
| 4,702,870 | 10/1987 | Setterholm et al. | 264/313 X |

FOREIGN PATENT DOCUMENTS

| | | | |
|---|---|---|---|
| 126269 | 3/1968 | Fed. Rep. of Germany . | |
| 2525011 | 12/1976 | Fed. Rep. of Germany . | |
| 2838344 | 3/1980 | Fed. Rep. of Germany | 264/35 |
| 830319 | 7/1938 | France . | |
| 61-36451 | 2/1986 | Japan . | |
| 404624 | 3/1974 | U.S.S.R. | 264/35 |
| 897530 | 1/1982 | U.S.S.R. | 264/35 |
| 669931 | 4/1952 | United Kingdom . | |
| 2062739 | 5/1981 | United Kingdom | 264/35 |

*Primary Examiner*—Karen Aftergut
*Attorney, Agent, or Firm*—Kanesaka and Takeuchi

[57] ABSTRACT

A depositing method of wall concrete, in which unset concrete is deposited in a form, includes the step of disposing a non-hygroscopic soft sheet which has a large number of hollow projections or ridges on an inner surface of the form being deformable when lateral pressure is applied thereto by the hardening of the concrete.

6 Claims, 10 Drawing Sheets

DEPOSITING METHOD OF WALL CONCRETE

FIELD OF THE INVENTION AND RELATED ART STATEMENT

The present invention relates to a depositing method of wall concrete, and particularly to the depositing method of the wall concrete suitable to a construction of a wall surface covered with tiles.

Conventionally, tiled walls are formed in such a manner that unset concrete is deposited in a form, and then the form is removed to construct the concrete wall. Then, as shown in FIG. 2, ground mortar 2 is applied on a surface of this concrete wall 1, and tiles 4 having bonding mortar 3 on their rear surfaces are pressed onto this ground mortar 2. Further, as shown in FIG. 3, in some cases, the ground mortar is eliminated, and the tiles 4 are directly bonded to the concrete wall 1 only by the bonding mortar 3.

In the prior art construction method of the concrete wall, the formed concrete wall has a flat finish surface complementary in shape to an inner surface of the form. Therefore, the surface of the concrete wall 1 may not be sufficiently bonded to the ground mortar 2 or the bonding mortar 3, so that the ground mortar 2 or the bonding mortar 3 is liable to be separated from the concrete wall 1, which may disadvantageously cause a falling accident of the tiles.

In order to solve this problem, the Japanese Patent Publication No. 50-31371 has disclosed an art in which a sponge piece is attached to a form surface so that this sponge piece may absorb the moisture in the deposited concrete and swells to form concave portions on the concrete surface after removal of the form, which increases the sticking force of the ground mortar.

However, a practical experiment of the method disclosed in Japanese Patent Publication No. 50-31371 has proved that cement component in the concrete enters the sponge, so that the sponge also hardens and sticks to the concrete. Therefore, a strong force is required for the removal of the form and peripheral portions of the concave portions are liable to be broken when removing the form. Further, the sponge will remain on the concave portions which decreases the stickiness of the ground mortar.

OBJECT AND SUMMARY OF THE INVENTION

It is an object of the invention to provide a depositing method of wall concrete for overcoming the above-noted problems, in which a wall surface suitable to a construction for tiling, i.e., the wall surface having a good bonding characteristic with respect to ground mortar and bonding mortar can be formed.

In a depositing method of wall concrete according to the invention a large number of projections or ridges are arranged on an inner surface of a form, for instance, by disposing a non-hygroscopic soft sheet having a large number of projections or ridges on an inner surface of a form. The soft projections or ridges may be integrally formed directly on the inner surface of the form.

According to the invention, since the many projections or ridges are formed on the inner surface of the form on which unset concrete is deposited, the concrete surface after the removal of the form has uneven portions caused by these projections or ridges. Since this soft sheet has non-hygroscopicity, good separability (form-releasability) can be obtained.

The concrete wall having the uneven portions thus formed has an extremely high bonding strength with respect to the mortar, so that tiles bonded thereto by ground mortar or bonding mortar are prevented from falling.

At least one uneven portion may be preferably formed for each tile, and more preferably, two or more uneven portions are formed for each tile. A concave or convex may preferably have a depth or height between 2 and 30 mm, and more preferably between 4 and 15 mm.

DETAILED DESCRIPTION OF THE PREFERRED EMBODIMENTS

Embodiments of the invention will be described in detail with reference to the accompanying drawings.

FIGS. 1A–1D are cross sections illustrating a depositing method of wall concrete of an embodiment of the present invention.

Figure 1A:
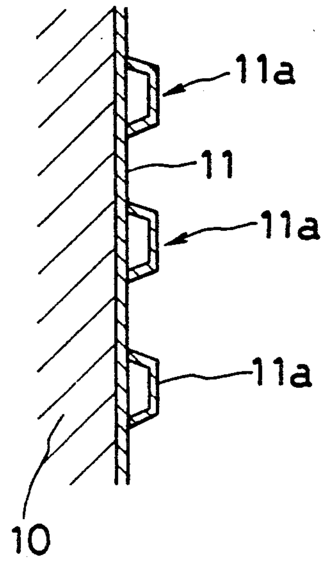
FIGS. 1A, 1B, 1C and 1D are cross sections illustrating a method of an embodiment of the invention.
Figure 1B:
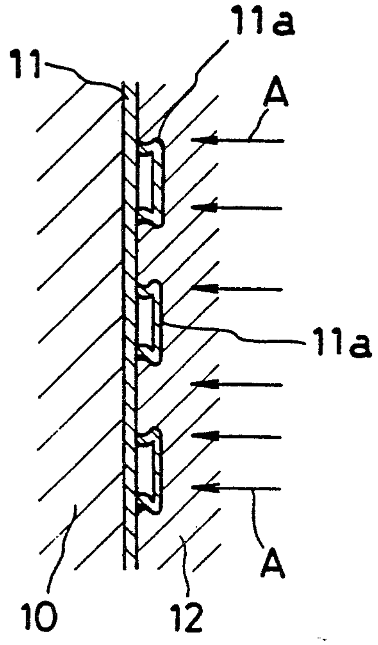
Figure 1C:
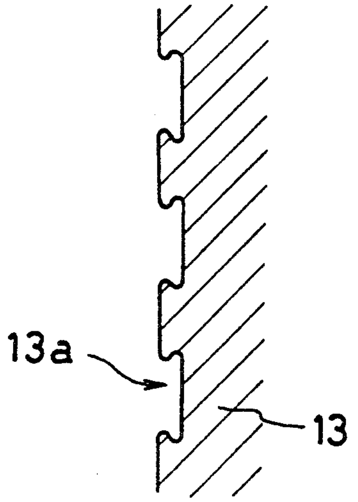
Figure 4:
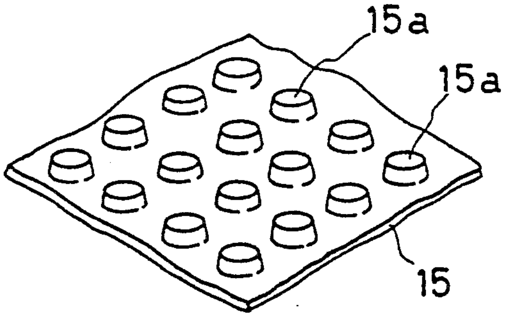
FIGS. 4 and 5 are perspective views illustrating an embodiment of a soft sheet.

As shown therein, according to the invention, unset concrete is deposited after a non-hygroscopic soft sheet 11 having a large number of projections 11*a* (foam projections in the Figure), such as a rubber sheet having projections 15*a* (foam projections or solid projections) shown in FIG. 4, is disposed on or attached to an inner surface of a form 10. Then the unset concrete 12 is deposited in an ordinary manner (FIG. 1B) and the form is removed after hardening and curing (FIG. 1C).

In this removal operation of the form, the soft sheet 11 which has the non-hygroscopicity can be easily separated from the hardened concrete surface. Of course, no damage is caused in portions around concave holes 13*a* described below.

Figure 1D:
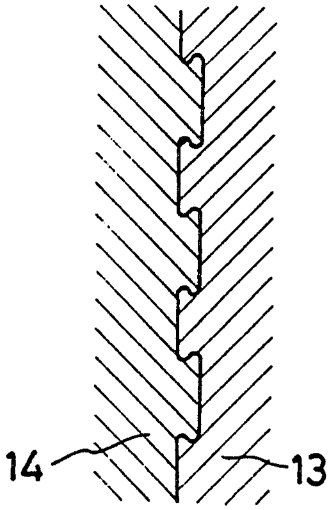
Figure 2:
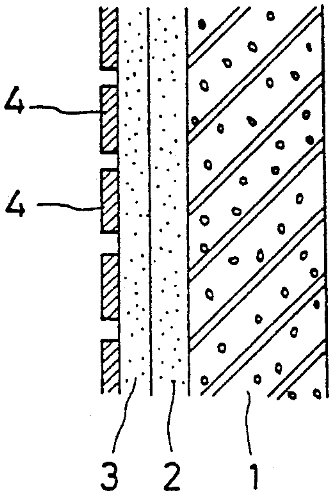
FIG.2 PRIOR ART
FIGS. 2 and 3 are cross sections illustrating a conventional tile bonding method.
Figure 3:
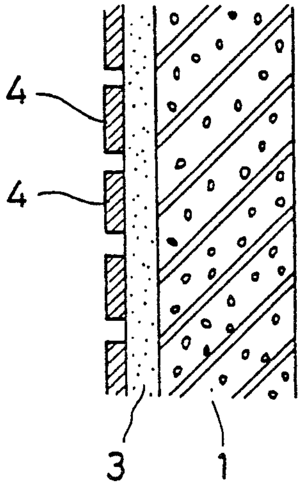
FIG.3 PRIOR ART

A concrete wall 13 formed in this manner has a surface construction provided with the concave holes 13*a* having narrow inlets or openings which are formed by the projections 11*a* of the soft sheet 11, as described above, so that mortar 14 such as ground mortar or bonding mortar applied on the surface sticks very firmly to the concrete wall 13 (FIG. 1D). That is, the projections 11*a* of the soft sheet 11 shown in FIG. 1A which are subject to a pressure A caused by hardening contraction of the unset concrete 12 are enlarged into divergent flat shapes, i.e., flat shapes having large top ends, as shown in FIG. 1B, and the unset concrete 12 will harden in this condition, so that as shown in FIG. 1C, the concave holes 13*a* having the narrow openings are formed on the concrete wall 13 after the removal of the form. The concave holes 13*a* having the narrow openings remarkably increase the stickiness of the mortar 14. Therefore, the concrete wall having the high bonding strength for the tiles is formed.

It will be understood that there is not particular restriction with respect to the shapes, sizes and numbers per unit area of the projections or ridges which are provided in the soft sheet, and they may be appropriately determined so as to obtain the sufficient bonding strength for the mortar. For instance, instead of the rubber sheet 15 shown in FIG. 4, a soft sheet 16 having ridges 16*a* shown in FIG. 5 or others may be used. The ridges may be arranged in a lattice relationship.

The projections of the soft sheet may be hollow or solid, and also may have porous structures including a large number of independent pores. Therefore, the soft sheet may be formed of a foam sheet having hollow projections. These projections or ridges may have divergent flat shapes as the initial shape, i.e., as the shape prior to the application of the lateral pressure by the concrete. Further, the soft sheet may preferably have an increased thickness and/or a high strength. In this manner, breakage of the soft sheet is suppressed in the separation operation of the soft sheet from the concrete surface and the separation is promoted when the form is removed.

There is no particular restriction with respect to the method for disposing or attaching the soft sheet to the inner surface of the form, and various methods such as those using a tacker or an adhesive double coated tape may be employed. The soft sheet may be disposed entirely on the inner surface of the form or may be disposed on a portion or portions thereof.

According to the depositing method of the wall concrete of the invention, the concrete wall having the unevenness on the surface can be formed. The formed concrete wall has the strong sticking or bonding force with respect to the mortar and thus have the sufficiently high bonding strength so that it is extremely suitable to the wall surface for the tiling work.

During the formation of the concrete wall, the unset concrete deposited on the form applies the pressure through the soft sheet to the form, and naturally this pressure is relatively small at an upper portion of the form and large at the lower portion.

Therefore, the projections or ridges of the soft sheet receive the small pressure at the upper portion of the form, and receive the increased pressure at the lower portion.

Accordingly, if all of the projections or ridges of the soft sheet have uniform hardness, the projections or ridges will not be deformed to a large extent at the upper portion of the form. On the other hand, the projections or ridges will nearly completely collapse due to the large pressure applied thereto at the lower portion, so that the intended shapes, i.e., the divergent flat shapes, will not be obtained in some cases.

In this case, it is preferable to use non-hygroscopic soft sheet provided with a few or several types of projections or ridges having different hardness. Thus, in this case, owing to the projections or ridges having the different hardness, the relatively soft projections or ridges deform into the divergent flat shapes at the upper portion of the form in which the small pressure is applied by the unset concrete. (The projections or ridges having the high hardness do not deform to a large extent at the upper portion of the form.)

Since the large pressure is applied to the lower portion of the form, the relatively hard projections or ridges deform into the divergent flat shapes at the lower portion. (The projections or ridges having the low hardness may collapse due to the concrete pressure.)

In this manner, the projections or ridges having the low hardness deform into the divergent flat shapes at the upper portion of the form, and the projections or ridges having the high hardness deform into the divergent flat shapes at the lower portion of the form, so that, even in a concrete wall having a large height, the whole surface of the formed concrete wall can surely have the divergent concave holes. Therefore, according to the invention, the stickiness of the mortar can be extremely improved through the whole surface of the concrete wall.

It is generally impossible to cover the whole inner surface of the form with a single soft sheet, and thus a plurality of soft sheets is juxtaposed. In this case, if the soft sheets are juxtaposed to overlap at the adjacent edges each other, the unset concrete would flow through these overlapped portions and enter between the rear surfaces of the soft sheets and the form surface. Therefore, the good uneven surface would not be formed, and further the form and the soft sheets would bond to the set concrete wall, which would cause difficulty in removing the form and separating the soft sheet, and particularly would damage the unevenness formed on the concrete wall due to the separation of the soft sheet in the separating operation thereof in some cases.

Therefore, in case the non-hygroscopic soft sheets are juxtaposed, to overlap the adjacent edges thereof each other, it is preferable to adhere or weld the overlapped portions so as to prevent the flow of the concrete toward the sheet rear surface.

Figure 6:
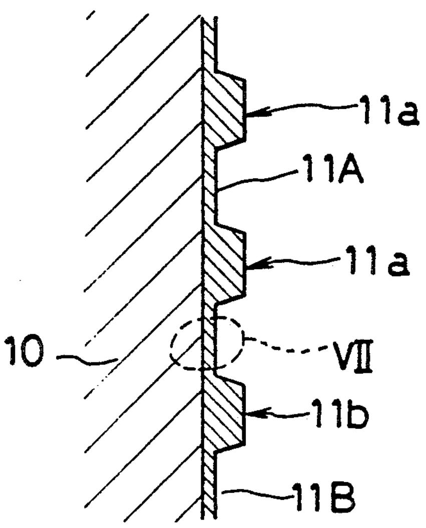
FIGS. 6 and 8 are cross sections illustrating another embodiment of the invention.
Figure 7:
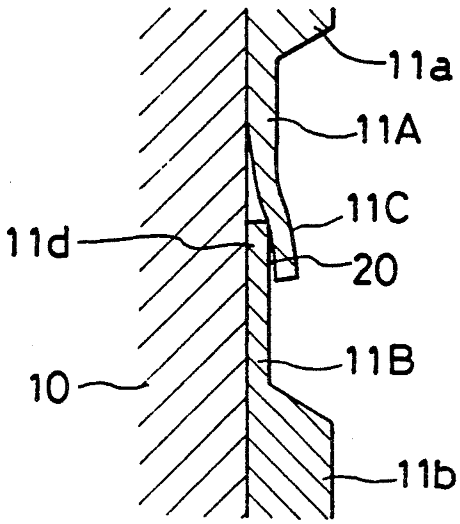
FIG. 7 is an enlarged view of a portion VII in FIG. 6.
Figure 8:
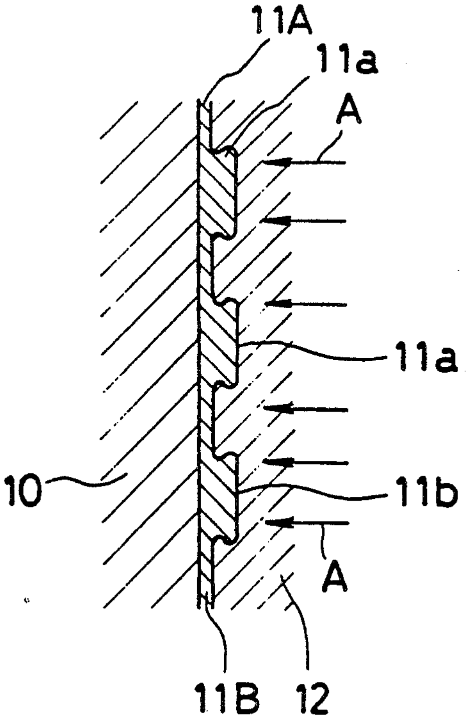
Figure 9:
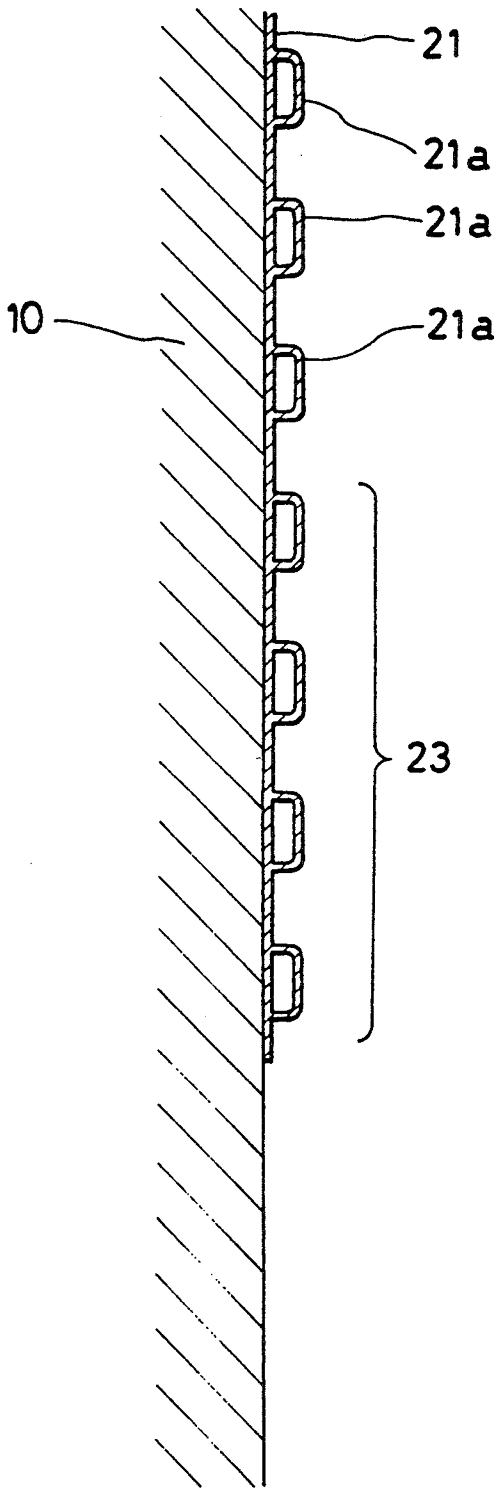
FIGS. 9, 10, 11, 12, 13 and 14 are cross sections illustrating a method of another embodiment of the invention.

That is, as shown in FIG. 6, when depositing the unset concrete, the inner surface of the form 10 is covered with a plurality of non-hygroscopic soft sheets 11A and 11B having a large number of projections or ridges 11*a* and 11*b*, such as the rubber sheets 15 having the projections shown in FIG. 4. In this covering operation, as shown in FIG. 7, which is an enlarged view of a VII portion in FIG. 6, the adjacent soft sheets 11A and 11B are arranged, to overlap their edges 11*c* and 11*d* each other, and the overlapped portions are adhered by adhesive 20 or welded, e.g., by heat welding. Then, in accordance with the ordinary manner, the unset concrete 12 is deposited (FIG. 8) and the form will be removed after the hardening and curing (see FIG. 1C).

As described above, since the edges 11*c* and 11*d* of the adjacent soft sheets 11A and 11B are overlapped each other, and the overlapped portions are adhered together by the adhesive 20 or welded together, e.g., by the heat welding, the unset concrete will not flow through these overlapped portions toward the rear surface of the soft sheet and the form 10, which enables the formation of the good uneven surface and facilitates the removal of the form and the separation of the soft sheet. Further, during the separating operation of the soft sheet, the uneven portions on the concrete wall are not damaged.

If the several soft sheets which have the hollow foam projections as well as the overlapped portions are to be disposed on the inner surface of the form, it is preferable to burst the hollow foam projections in the overlapped portions of the soft sheet located at the inner or lower side prior to the disposing thereof.

That is, if the soft sheets having the hollow foam projections are merely overlapped each other, the overlapped hollow foam projections would remarkably increase the total thickness. This would cause a stepped portion at a boundary between an overlapped region and an unoverlapped region of the soft sheets on the deposited concrete wall surface. Further, as described before, water-tightness would not be guaranteed at the overlapped region, so that the unset concrete would enter through gaps between the hollow foam projections of the soft sheets, resulting in difficulty in removing the soft sheets from the concrete wall surface when removing the form.

However, by bursting the hollow foam projections at the overlapped region of the soft sheet located at the lower side prior to the disposing, the rear surface of the soft sheet at the upper side and the top surface of the soft sheet at the lower side can be brought into intimate contact with each other. Therefore, the overlapping does not substantially increase the thickness, so that the deposited concrete wall surface has the substantially uniform surface configuration. Further, the water-tightness is guaranteed at the overlapped region, so that the adhesion or heat welding described before is not essential for preventing various problems due to leakage of the unset concrete. Naturally, in this case, the overlapped portions may be adhered or heat-welded together.

The method for this case will be described below with reference to FIGS. 9–15. When a plurality of soft sheets 21 and 22 having a large number of hollow foam projections 21*a* and 22*a* is to be disposed, each of them is partially overlapped with the other, and the soft sheet 21 is disposed first on the inner surface of the form 10 and thus is located at the lower side where a predetermined region 23 to be overlapped is burst. This operation can be effected by using a roller 30 shown in FIG. 15 provided at its peripheral surface with needle-shaped protrusions 31. Alternately, a heating roll or press may be used to burst the hollow foam projections by thermal melting.

Figure 10:
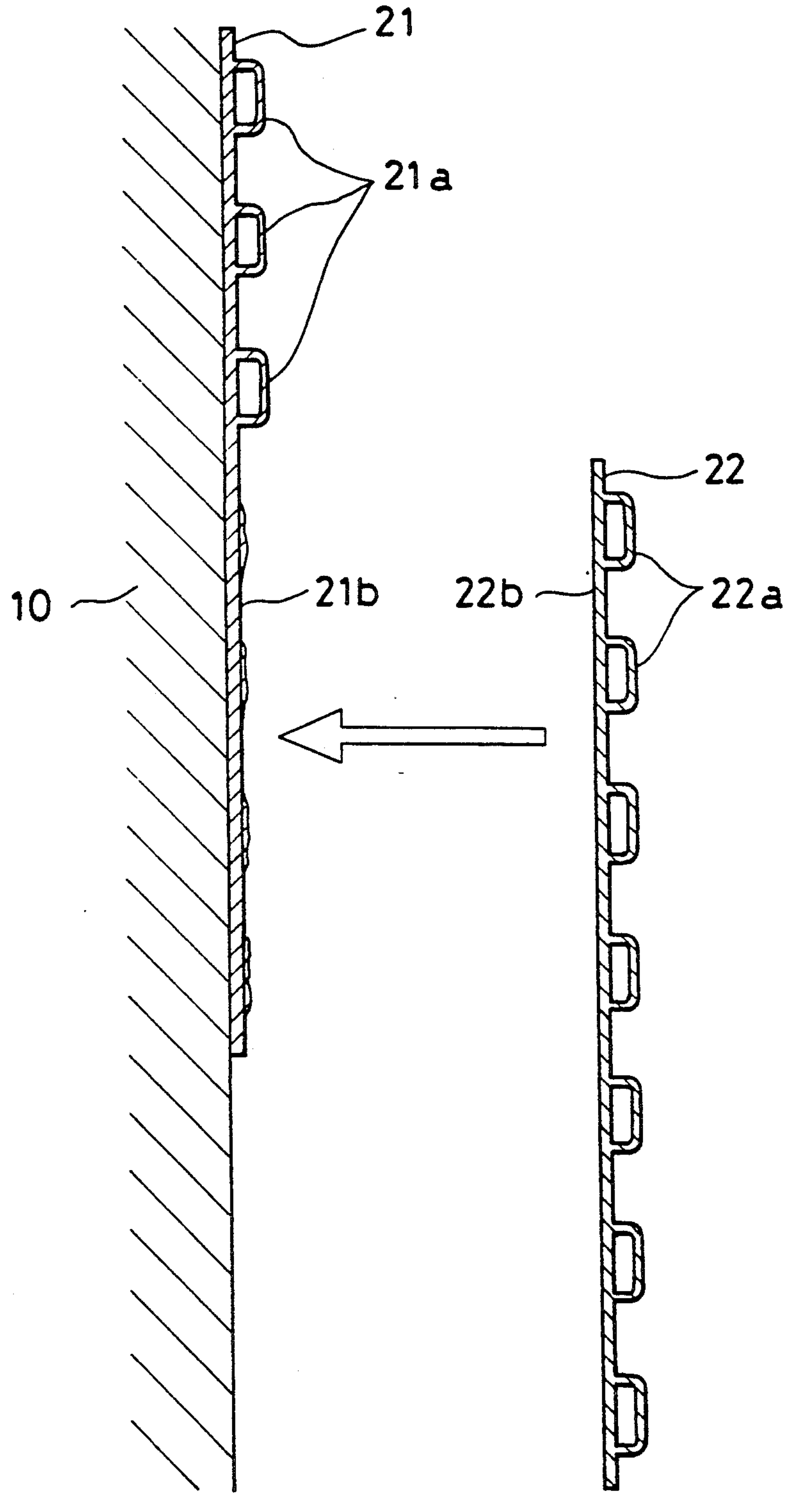
Figure 11:
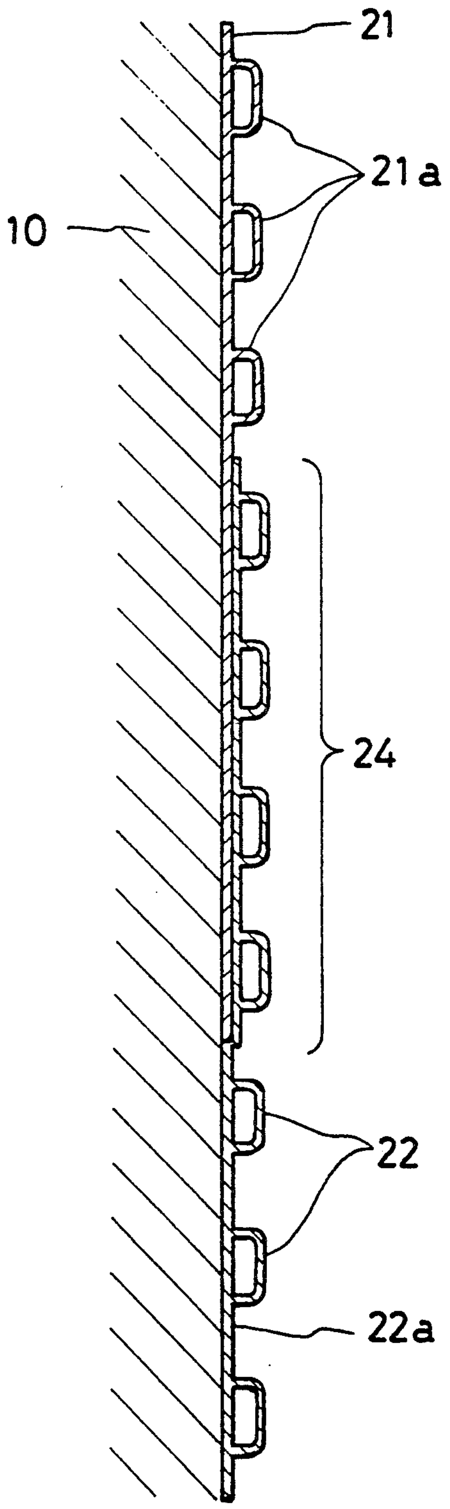

Then, as shown in FIG. 10, the soft sheet 21 having the burst hollow foam projections 21*a* in the predetermined region 23 is overlapped with a portion of the other soft sheet 22, and these sheets are disposed on the inner surface of the form 10. In this operation, a rear surface 22*b* of the soft sheet 22 located at the upper side is brought into intimate contact with the top surface 21*b* of the soft sheet 21 located at the lower side. Therefore, only a slight increase of the thickness is caused, as shown in FIG. 11, and the water-tightness is guaranteed in the overlapped region 24.

Figure 12:
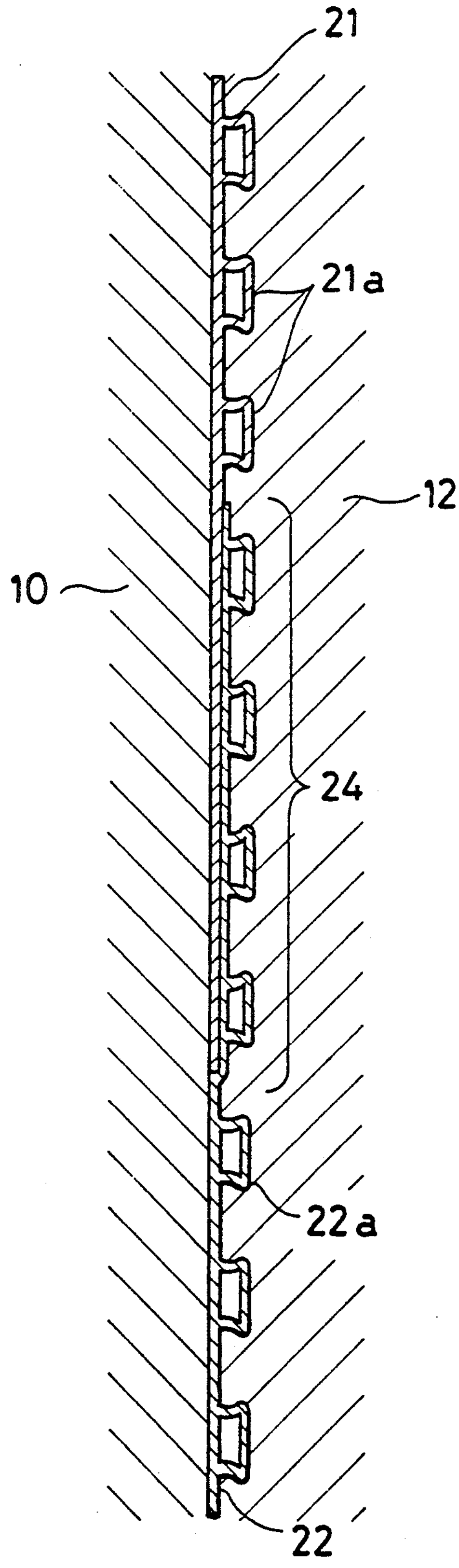

After the several soft sheets 21 and 22 are disposed in the form 20, as described above, the unset concrete 12 is applied onto this form 10, as shown in FIG. 12. Since the soft sheets 21 and 22 are in intimate contact with each other at the overlapped region 24 for keeping the water-tightness, there is not fear of leakage of concrete 12. Further, there is substantially no difference in thicknesses at the overlapped region 24 and the unoverlapped region, so that the deposited concrete wall will have the substantially uniform surface configuration.

Figure 13:
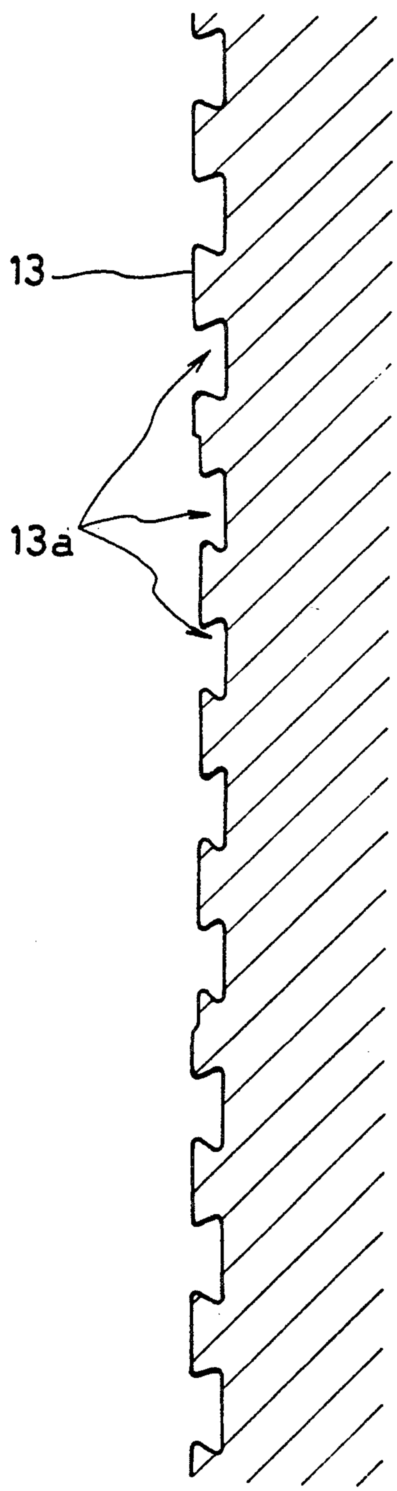

As described above, the hollow foam projections 21*a* and 22*a* on the soft sheets 21 and 22 are flattened by the pressure caused by the hardening contraction of the unset concrete as shown in FIG. 12. Therefore, when the form 10 is removed after the curing for a predetermined period, the many concave holes 13*a* having the narrow openings are formed on the concrete wall 13, as shown in FIG. 13.

Figure 14:
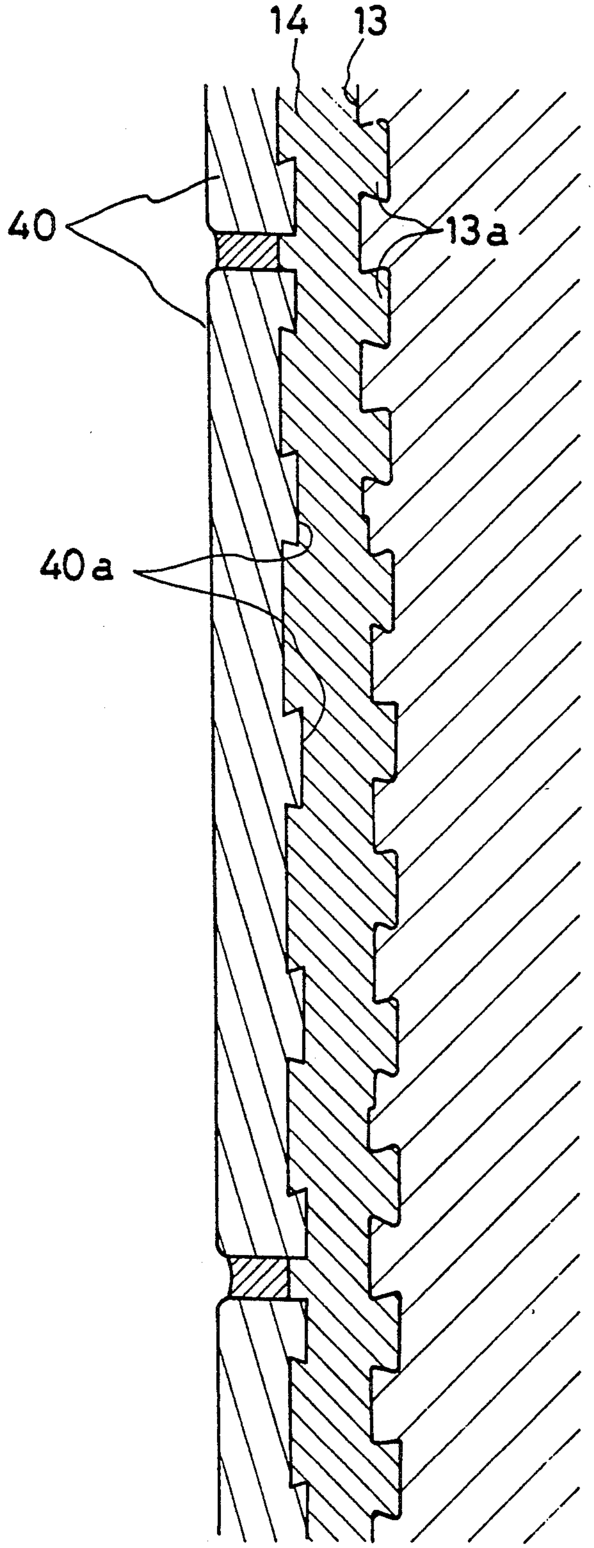
Figure 15:
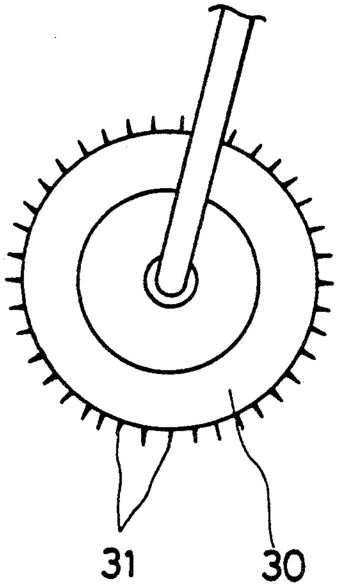
FIG. 15 is a side view illustrating an embodiment of a roller for bursting hollow foam projections.

When the mortar 14 is applied onto the concrete wall 13 thus deposited as shown in FIG. 14, and tiles 40 are laid thereon, the mortar 14 enters into the many concave holes 13*a* formed on the wall 13, and will exhibit an anchor effect after the hardening. This extremely increases the bonding strength between the concrete wall 13 and the mortar 14. On the other hand, the bonding strength between the tile 40 and the mortar 14 are fully ensured by rear legs 40*a*. Therefore, there is extremely low possibility of occurrence of a falling accident of the tiles 40.

In this method, the several soft sheets can be used without causing any loss of the excellent bonding strength between the mortar and the concrete wall. Therefore, the form having a large area which cannot be fully covered with a single soft sheet can be used, so that a depositing efficiency of the concrete wall can be increased.

Further, in spite of the overlapping of the portions of the several soft sheets disposed on the inner surface of the form, the above method can ensure the water-tightness in the overlapped regions and does not substantially increase the sheet thickness, so that the concrete wall having the uniform surface configuration through a large area can be deposited.

In the depositing method of the wall concrete according to the invention, the unset concrete is deposited on the form, the non-hygroscopic soft sheet having the many ridges is disposed on the inner surface of the form, and the ridges are deformed into the flat shapes by the lateral pressure of the deposited unset concrete, so that the set concrete may have concave grooves, each groove forming an angle less than 90 degrees between one of their side surfaces and the concrete surface and an angle of 90 degrees or more between the other side surface and the concrete surface. Or in the method, the unset concrete is deposited on the form, the non-hygroscopic soft sheet having the many projections is disposed on the inner surface of the form, and the projections are deformed into the flat shapes by the lateral pressure of the deposited unset concrete, so that the set concrete may have concave holes, each forming an angle less than 90 degrees between one of their side surfaces and the concrete surface and an angle of 90 degrees or more between the other side surface and the concrete surface. Therefore, the stickiness of the mortar can be increased, and also the separability of the soft sheet can be increased.

This method will be described below with reference to FIGS. 16–21.

Figure 5:
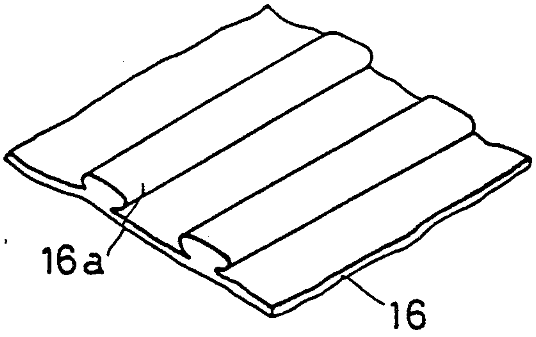

As shown in the Figures, according to the invention, the non-hygroscopic soft sheet 11 having the many ridges or projections 11*a*, such as the rubber sheet 15 having the projections 15*a* shown in FIG. 4 or the soft sheet 16 having the projections 16*a* shown in FIG. 5, is disposed on the inner surface of the form 10. Thereafter, in the ordinary manner, the unset concrete 12 is deposited (FIG. 17), and the form is removed after the hardening and curing (FIG. 18).

When removing the form, since the soft sheet 11 has the non-hygroscopicity and the formed concave grooves or concave holes 33 have the particular shapes as described below, the soft sheet can be easily separated from the concrete surface. Of course, when separating the soft sheet 11, the portions near the concave grooves or concave holes 33 are not damaged and also any torn piece of the soft sheet does not remain on the concrete surface.

Figure 16:
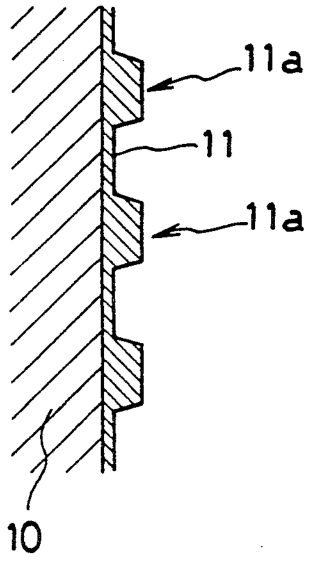
FIGS. 16, 17, 18 and 19 are cross sections illustrating a method of still another embodiment of the invention.
Figure 17:
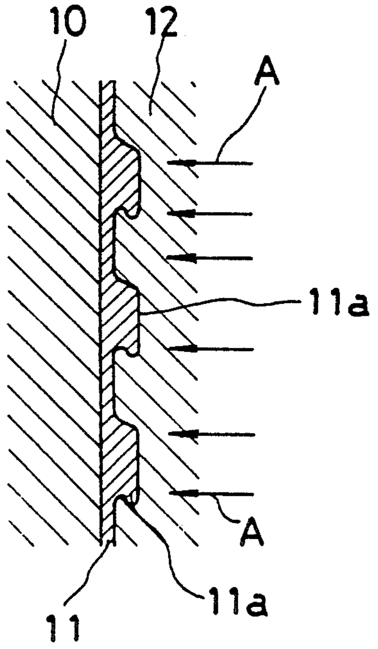
Figure 18:
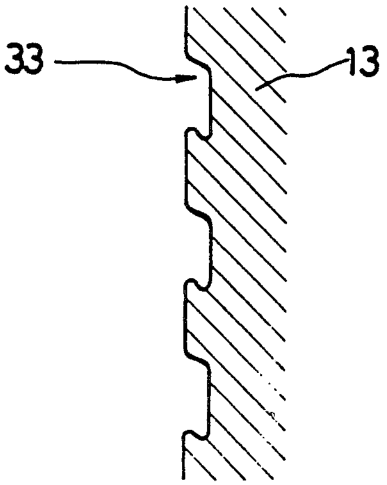
Figure 19:
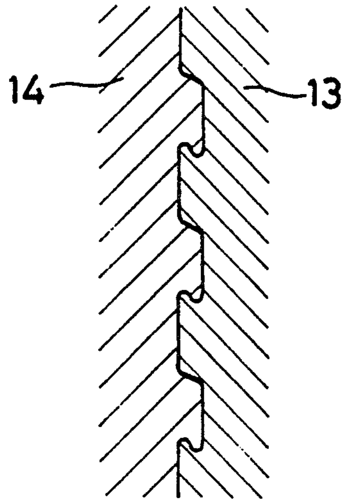

That is, the projections 11*a* of the soft sheet 11 shown in FIG. 16 are subject to the pressure A caused by the hardening contraction of the unset concrete 12 and are enlarged into the flat shapes, as shown in FIG. 17. In this condition, the unset concrete 12 will set to form the concave grooves or concave holes 33, as shown in FIGS. 18 and 19 to each forming an angle (theta 1) less than 90 degrees between one of the side surfaces 33*a* and the concrete wall surface 13A and an angle (theta 2) of 90 degrees or more between the other side surface 33*b* and the concrete wall surface 13A. These concave grooves or concave holes 33 provide the remarkably high stickiness of the mortar 14 because (theta 1)$<90°$ and also prevent excessive retaining of the soft sheet 11 in the concave grooves or concave holes 33 because of (theta 2)$\geqq 90°$, so that easy and reliable separation can be achieved without damaging the concrete surface around the concave grooves or concave holes 33 and without leaving the torn piece of the soft sheet.

Figure 20:
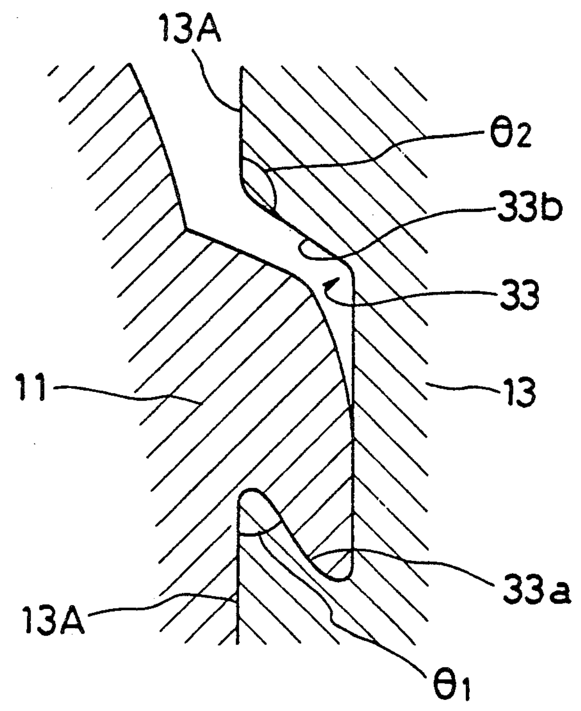
FIGS. 20 and 21 are enlarged cross sections illustrating a method of an embodiment of the invention.
Figure 21:
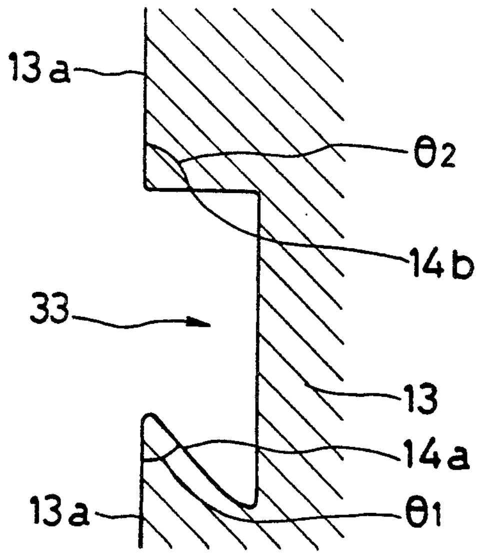

It will be understood that the angle (theta 2) formed between the other side surface 33*b* of each concave groove or concave hole 33 and the concrete surface 13*a* may be an open angle as shown in FIG. 20 or may be of about 90 degrees, as shown in FIG. 21.

The concrete wall 13 formed in this manner has the good surface construction provided with the concave grooves or concave holes 33 described above, owing to the projections 11*a* of the soft sheet 11, so that the mortar 14 such as the ground mortar or the bonding mortar applied on the surface can stick very firmly to the concrete wall 13 (FIG. 19). Therefore, the concrete wall having the high tile bonding strength can be formed.

The projections or ridges of the soft sheet used in this method are required, as described above, to form the concave grooves or concave holes on the concrete surface, each of which forms the angle less than 90 degrees between the first side surface and the concrete surface and the angle of 90 degrees or more between the second side surface and the concrete surface, so that, for instance, they have a low hardness on the side for forming said first side surface and have a high hardness for the second side. That is, if the solid or porous ridges or projections are used, their hardness is partially varied, and, if the hollow ridges or projections are used, the hardness is varied, for instance, by varying the thickness of shells thereof. It will be understood that these ridges or projections may have initial shapes, (i.e., shapes before the application of the concrete lateral pressure) which can form the concave grooves or concave holes of said predetermined shapes.

What is claimed is:

1. A depositing method of wall concrete, comprising:

preparing a non-hygroscopic soft sheet having a large number of hollow projections extending outwardly from the sheet, each hollow projection having a top portion located away from the sheet and a base portion located close to the sheet and being deformable when lateral pressure is applied thereto, attaching the soft sheet onto a form so that the hollow projections face outwardly from the form, depositing unset concrete onto the soft sheet disposed on the form so that the unset concrete closely surrounds the hollow projections, hardening the concrete so that each projection is subject to lateral pressure caused by hardening contraction of the unset concrete such that each projection is deformed onto a divergent flat shape by the lateral pressure wherein the top portion of each projection becomes large and the base portion of each projection becomes smaller than its corresponding top portion, removing the soft sheet with the hollow projections from the hardened concrete so that a large number of holes are formed in the hardened concrete, each hole having a large bottom portion with a narrow opening respectively corresponding to the large top portion and the smaller base portion of the deformed hollow projections, and applying an unset material onto the hardened concrete and into the holes thereof, and hardening the material so that the unset material is hardened in the holes of the hardened concrete to thereby securely join the applied material onto the hardened concrete due to each hole having the large bottom portion with the narrow opening.

2. A method according to claim 1, wherein each projection has different hardness to compensate for different pressures applied by the unset concrete.

3. A method according to claim 1, wherein a plurality of non-hygroscopic soft sheets, each having a large number of hollow projections, are juxtaposed with each other such that after the hollow projections formed on a lower edge of a first soft sheet are crushed, an upper edge of a second soft sheet is situated above the lower edge of the first soft sheet and is firmly engaged thereto.

4. A method according to claim 1, wherein each hole has first and second side surfaces, an angle between the first side surface and a concrete surface being less than 90 degrees and an angle between the second side surface and the concrete surface being 90 degrees or more.

5. A method according to claim 1, wherein each hollow projection has a shape of a conical trapezoid.

6. A method as claimed in claim 1, wherein a plurality of non-hygroscopic soft sheets are juxtaposed, edges of said juxtaposed soft sheets are overlapped with each other and said overlapped edges are adhered or welded together so as to prevent flow of said concrete toward rear surfaces of said sheets.

* * * * *